3,197,770
SEARCH-WHILE-TRACK RADAR SYSTEM
Earl H. Rix, Harman, and David R. Houston, North Linthicum, Md., assignors, by mesne assignments, to the United States of America as represented by the Secretary of the Navy
Filed Aug. 29, 1962, Ser. No. 220,927
4 Claims. (Cl. 343—7)

The present invention relates to a radar system which is capable of simultaneously performing search and track functions. More particularly, the present invention relates to a search-while-track radar system of such character that existing radar systems which include independent search and track functions may be modified to provide a search-while-track function.

Prior devices have dealt in a general way with radars which have both search and track functions with manual or automatic changeover from one to the other; however, such devices do not permit simultaneous performance of both the search and track functions.

The conventional solution to the problem of obtaining combined simultaneous search and track functions of radar systems is to use separate radars. Obviously, such a solution is unsatisfactory for many reasons including increased weight and complexity and decreased reliability of such a dual system when compared to a simplified system such as that in the present invention.

Therefore, it is an object of the present invention to provide a radar system which is capable of simultaneously performing search and track functions.

It is another object of the present invention to provide a means whereby existing radar systems which include independent search and track functions may be modified to perform simultaneously search and track functions.

It is a further object of this invention to provide a radar system which is capable of tracking a predetermined object or objects while simultaneously performing a search function.

Still another object of the present invention is to provide a radar system which automatically switches from a search-while-track function to a track function when a predetermined position is reached by an object or objects being tracked.

Other objects and many of the attendant advantages of this invention will be readily appreciated as the same become better understood by reference to the following detailed description when considered in connection with the accompanying drawings wherein:

FIG. 4 is a schematic circuit diagram showing the antenna servomotor control system of FIG. 1 in greater detail.

Figure 1:
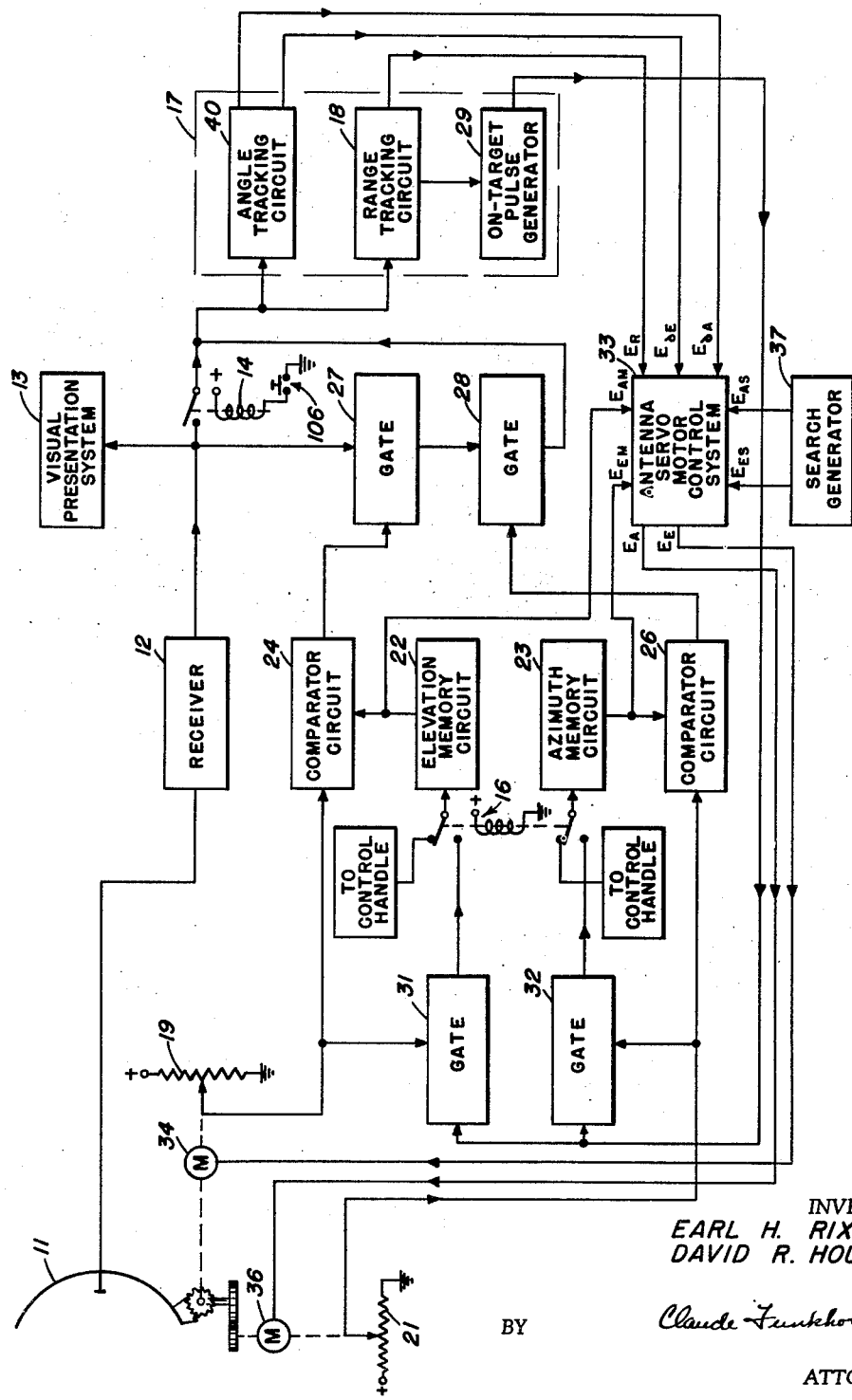
FIG. 1 is a block diagram of an illustrative embodiment of the present invention.

Referring now to FIG. 1, it may be seen that the search-while-track radar system includes an antenna 11 which may be used for both transmitting and receiving radar signals. However, only the receiving system is important to an understanding of the present invention, and therefore, only the receiving system is shown. Electrically connected to antenna 11 is radar receiver 12 which in turn is electrically coupled to visual presentation system 13. Switch 14 is interposed between receiver 12, visual presentation system 13 and the tracking circuit 17. This switch is shown in FIG. 1 to be open, and is closed only when the radar system functions as a tracking radar and is not operating in the search-while-track mode. The received radar signal is transmitted to the tracking circuits designated generally as 17 through either switch 14 or gates 27 and 28 in a manner to be hereinafter described. Tracking circuits 17 include angle tracking circuit 40, range tracking circuit 18 and on-target pulse generator 29. Angle tracking circuit 40 and range tracking circuit 18 are connected to antenna servomotor control system 33. The azimuth and elevation information from angle tracking circuit 40 is transmitted through antenna servomotor control system 33 to servomotors 34 and 36 when the radar system is in the track mode of operation. Servomotor 34 adjusts antenna 11 and the position of potentiometer pickoff on potentiometer 19 to the correct elevation for an object being tracked. Servomotor 36 performs a similar function in response to the azimuth error signal transmitted from angle tracking circuit 40. This function of angle tracking circuit 40 is performed only when the system is in the track mode of operation as will be hereinafter described. The elevation and azimuth position indications determined by the positions of the pickoffs on potentiometers 19 and 21 respectively are transmitted to comparator circuits 24 and 26 respectively. These elevation and azimuth signals are compared in comparator circuits 24 and 26 respectively with voltages stored in elevation and azimuth memory circuits 22 and 23 in a manner to be hereinafter described. Comparator circuit 24 is connected to gate 27, while comparator circuit 26 is connected to gate 28. As shown in FIG. 1, the elevation and azimuth memory circuits 22 and 23 are initially connected to the control handle in the operator's console. This connection is achieved by switch 16. Gates 31 and 32 are connected to on-target pulse generator 29 and function to couple elevation and azimuth information into elevation and azimuth memory circuits 22 and 23 when the radar system is in the search-while-track mode of operation. Memory circuits 22 and 23 may be of the type shown and described in Patent No. 3,090,556, issued to Melvin P. Siedband, Charles C. Ryan, and David R. Houston. Search generator 37 serves to energize antenna servo drive motors 34 and 36 during the search-track mode of operation of the radar system. The nature of the voltages provided by search generator 37 depends upon the type of antenna scan motion desired. Angle tracking circuit 40 is described in detail in Patent No. 2,907,205, issued to Gordon W. Kraeger, for Trigger Synchronizing Sequential Lobing Radar Installation.

Figure 2:
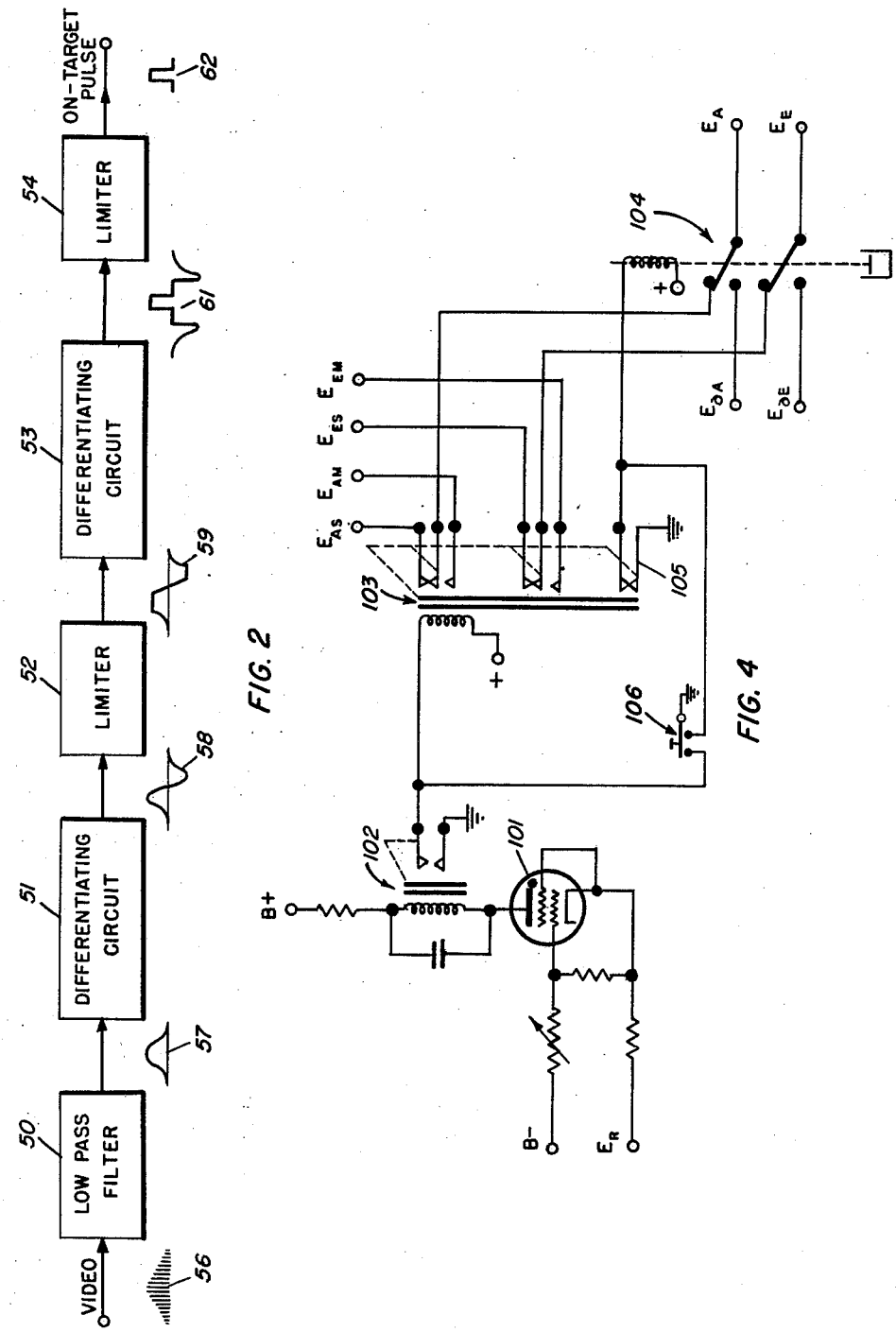
FIG. 2 is a block diagram showing the on-target pulse generator of FIG. 1 in greater detail.

Range tracking circuit 18 and on-target pulse generator 29 may be any of several types known in the art. A block diagram of one prior art on-target pulse generator will be shown and described. However, other typical prior art circuits may be utilized to perform the functions of range tracking circuit 18 and on-target pulse generator 29. FIG. 2 shows a block diagram of a typical prior art circuit which may function as on-target pulse generator 29.

The on-target pulse generator 29 includes a low pass filter 50 which receives the video signal 56 from receiver 12. The video signal is transmitted from low pass filter 50 to differentiating circuit 51, to limiter 52, to differentiating circuit 53, thence to limiter 54 from which an on-target pulse 62 is issued.

In operation, low pass filter 50 separates out the envelope of the video impulses 56 and passes this envelope to differentiating circuit 51. The amplitudes of pulses 56 vary in dependence on the directivity of a target with respect to antenna 11. Since low pass filter 50 passes only the low frequency components of the video signal 56, the output of low pass filter 50 is the envelope curve 57 of the train of pulses 56. The circuit 51 differentiates this envelope wave and consequently produces the curve 58 which limiter 52 transforms into curve 59. The second differentiating circuit 53 produces the curve 61 which presents a strong positive peak at the moment when the curve 59 passes through O. That is, the positive peak occurs at the moment of a maximum of train 56 when the orientation of the axis of antenna 11 coincides with the target direction. This positive peak is situated between two negative pulses which are eliminated by the limiting circuit 54 acting as a limiter and threshold circuit to produce curve 62.

Figure 3:
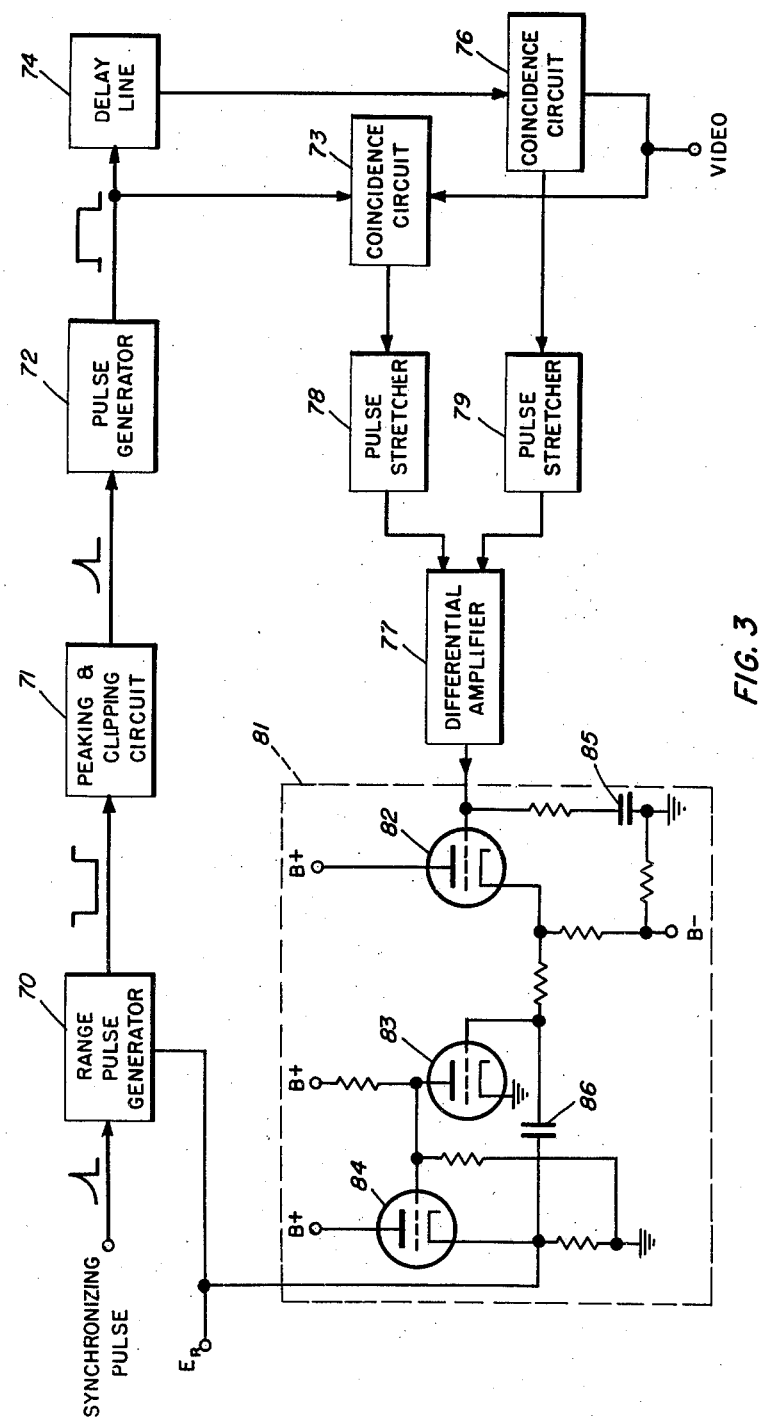
FIG. 3 shows partly in block diagram form and partly in schematic form the range tracking circuit of FIG. 1 in greater detail.

FIG. 3 shows a typical prior art circuit which may be utilized to perform the range tracking function of circuit 18. The circuit comprises a range pulse generator 70 to which are connected in series peaking and clipping circuits 71 and pulse generator 72. The output of pulse generator 72 is divided so that one pulse is coupled directly to coincidence circuit 73 and another pulse passes through delay line 74 to coincidence circuit 76. The video signal from receiver 12 is also coupled into coincidence circuits 73 and 76. The output of each of coincidence circuits 73 and 76 is coupled to pulse stretchers 78 and 79 respectively, and thence to differential amplifier 77. The output of differential amplifier 77 is coupled to range memory circuit 81. Memory circuit 81 consists of tubes 82, and 84 connected as cathode followers, along with amplifier tube 83 and capacitors 85 and 86.

The operation of range tracking circuit 18 is as follows: At the time of occurrence of the transmitted radar pulse, a pulse from the synchronizing pulse generator is applied to range pulse generator 70 to generate a square wave of variable length with the trailing edge of the pulse occurring a variable time after the occurrence of the leading edge of the pulse. The negative square wave is applied to a peaking and clipping circuit 71 which generates a short duration pulse coincident with the trailing edge of the input pulse. The output from peaking and clipping circuits 71 is coupled to pulse generator 72 to generate a square wave of selected length beginning upon the occurrence of the pulse from peaking and clipping circuits 71. The output pulse from pulse generator 72 is applied directly to a coincidence circuit 73 and through a delay line 74 to a coincidence circuit 76. The video signal from receiver 12 is also applied to coincidence circuits 73 and 76. The output of each of coincidence circuits 73 and 76 is applied respectively to pulse stretchers 78 and 79. Pulse stretchers 78 and 79 extend the duration of the pulses from coincidence circuits 73 and 76 so that the outputs of pulse stretchers 78 and 79 are for all practical purposes a direct current. It should be noted here that the pulse applied from pulse generator 72 to coincidence circuit 73 is designed to arrive at coincidence circuit 73 immediately prior to the arrival of the video pulse from receiver 12 representing the object being tracked. Delay line 74 is designed so that the pulse arriving at coincidence circuit 76 from pulse generator 72 arrives immediately subsequent to the arrival of the video pulse from receiver 12. In effect the function of each of coincidence circuits 73 and 76 is that of a gate, so that only so much of the video pulse as is coincident with the pulse from pulse generator 72 is transmitted to pulse stretcher 78. Therefore, the magnitude of the output of pulse stretchers 78 and 79 is dependent upon the accuracy of the timing of range pulse generator 70. The ideal situation is for the video pulse from receiver 12 to coincide with the trailing edge of the pulse from pulse generator 72 in coincidence circuit 73, and with the leading edge of the pulse in coincidence circuit 76 from pulse generator 72. In this situation, the outputs of pulse stretchers 78 and 79 are equal in amplitude and will cancel in differential amplifier 77, resulting in no output from the amplifier. However, an error in the timing of the emission of a pulse from range pulse generator 70 will result in a difference in the output of pulse stretchers 78 and 79, and thus in an error signal being coupled from differential amplifier 77 into capacitor 85 which then charges to the error voltage. The voltage on capacitor 85 controls the conduction of cathode follower 82 which thereupon controls the potential appearing on capacitor 86. Capacitor 86 performs an integrating function so that at all times the voltage appearing across the capacitor 86 is proportional to range. The voltage on capacitor 86 appearing at the cathode of cathode follower 84 is coupled back to the range gate generator 70 to control the position of the trailing edge of the pulse. The output of cathode follower 84 is also coupled as an output voltage $E_R$ to control the operation of antenna servometer control system shown in FIG. 1. This voltage is indicative of the range of the object being tracked by the search-while-track radar system. The system shown in FIG. 3, in effect, operates as a servo loop to always provide an output signal proportional to target range.

Antenna servomotor control system 33 is shown in detail in FIG. 4. Control system 33 consists of a thyratron 101, a plate relay 102, relay 103, relay 104, and contacts 105. The range error voltage $E_R$ from range tracking circuit 18 is compared with a bias voltage B—, and a differential voltage, which is the difference in $E_R$ and B—, is applied to the control grid of a thyratron 101. When the negative range voltage reaches a sufficient magnitude thyratron 101 becomes conducting, closing the contacts of its plate relay 102. Prior to the closing of the contacts of plate relay 102, the voltages $E_{AS}$ and $E_{ES}$ from search generator 37 (FIG. 1) are coupled through the normally closed contacts of relay 103 and the normally closed contacts of relay 104 to energize servomotors 34 and 36 with voltages $E_A$ and $E_E$. The closing of the contacts of plate relay 102 causes the back contacts of relay 103 to close and the contacts 105 thereof to open. The voltages designated as $E_{AS}$ and $E_{ES}$ are the control voltages for azimuth servomotor 36 and for elevation servomotor 34 respectively when the radar system is in the search mode of operation. The leads designated as $E_A$ and $E_E$ are the electric connectors for coupling the elevation and azimuth servomotor control voltages from antenna servomotor control system 33 to servomotors 19 and 21 respectively. The closing of the contacts of plate relay 102 causes the back contacts of 103 to close and the contacts 105 thereof to open. The closing of the back contacts of relay 103 couples the voltages from the azimuth and elevation memory circuits $E_{AM}$ and $E_{EM}$ through the normally closed contacts of time delay relay 104 to control the servomotors. The opening of contacts 105 of relay 103 deenergizes relay 104 so that, after a time delay, a circuit is completed through the back contacts of this relay. Thereupon the error voltages from angle tracking circuit 40, $E_A$ and $E_E$, are coupled through the back contacts of relay 104 to thereafter control the operation of the servomotors. The control of the servomotors 34 and 36 by the error voltage from angle tracking circuit 40 is not initiated, as can be seen by the foregoing description, until the target being tracked is within a predetermined range set in thyratron 101 bias circuit. Accept button 106 operates to energize relay 103 and close switch 14 while maintaining current in relay 104. Accept button 106 is actuated by the radar system operator and energizes relay 103 to close its back contacts so that the antenna servomotors are connected to the memory circuits 22 and 23. The antenna is thereby slewed toward the target. During the time that memory circuits 22 and 23 are connected to the control handle they store signals whose magnitudes are controlled by the position of the control handle. When accept button 106 is actuated, upon acquiring a desired target in visual presentation system 13, the position of the control handle indicates the orientation of the target so that the antenna is slewed to the direction of the target indicated by the control handle. When the antenna is directed toward the selected target and an indication that it is so directed is given by the on-target pulse generator 29, the accept button 106 is released so that the search generator 37 is again connected to energize the antenna servomotors.

When accept button 106 is actuated, relay 16 operates to connect elevation and azimuth memory circuits 22 and 23 respectively to gates 31 and 32 respectively so that upon emission of an on-target pulse the angular coordinates of the target toward which antenna 11 is directed are fed into memory circuits 22 and 23.

Upon actuation of control button 106 switch 14 is momentarily closed so that the radar system operates in the track mode to direct the antenna toward the desired target. Upon acquiring the target, accept button 106 is released and switch 14 opens to place the radar system in the search-while-track mode of operation. Switch 14 is closed only long enough to allow initial acquisition of the selected target in the tracking system. After initial acquisition of a target is achieved the radar system returns to the search-while-track mode of operation so that the radar continues to search the field while tracking the selected target.

In operation the radar system is initially as shown in FIG. 1. The elevation and azimuth memory circuits are connected to the control handle which is physically located in the operator's console through the contacts of switch 16. By movement of the control handle the operator can designate the angular coordinates of the object to be tracked. The angular coordinates of the object to be tracked are fed into memory circuits 22 and 23 through relay 16 and are used to initially direct antenna 11 toward the object to be tracked when the radar system is placed in accept condition as has been hereinbefore described. In this condition, the radar is in search condition and the video target return is coupled from antenna 11 through a conventional radar receiver 12 to a conventional visual presentation system 13 which may, for example, comprise a plan position indicator provided with the usual sweep control circuits. When the operator observes on his visual indicator a target which he desires to track, he selects the angular coordinates of the target so that the azimuth and elevation memory circuits register the initial azimuth and elevation position of the object desired. Thereupon, the operator places the radar system into accept condition which switches switch 16 to its lower position thereby connecting elevation and azimuth memory circuits 22 and 23 respectively to gates 31 and 32 respectively. Thereby, on receipt of a signal from on-target pulse generator 29 gates 31 and 32 open so that the initial elevation and azimuth positions of the object being tracked are stored in elevation memory circuit 22 and azimuth memory circuit 23. It should be noted that switch 14 was momentarily closed during the accept condition, but will otherwise remain open throughout the entire operation of the radar system until the system automatically changes to a tracking system when the object being tracked reaches a predetermined range. With the system in the above described condition, a video signal is received in receiver 12 and is transmitted to visual presentation system 13 during the track scanning operation of the radar system. As can be seen by reference to FIG. 1, the azimuth and elevation of the antenna is continuously fed into comparator circuits 26 and 24 respectively while the antenna is scanning. This information is compared in comparator circuits 24 and 26 with the elevation and azimuth information that has been initially stored in memory circuits 22 and 23. When the antenna reaches a position which is approximately, within a normal range, equal to the position of the object being tracked as originally read, gates 27 and 28 open to allow received pulse from receiver 12 into tracking circuit 17. It should be noted that both elevation comparator circuit 24 and azimuth comparator circuit 26 must be within an approximate range of the prior elevation and azimuth positions of the object being tracked before gates 27 and 28 will open to allow the video signal from receiver 12 to enter the tracking circuit 17. In tracking circuit 17 of the radar system, voltages indicative of the range and velocity of the target are transmitted to range tracking circuit 18 as hereinbefore described with reference to FIG. 3. The information received in range tracking circuit 18 is transmitted to on-target pulse generator 29 which emits a pulse indicating that the position of the antenna is coincident with the object being tracked. Upon receipt of the on-target pulse in gates 31 and 32 the gates open and elevation and azimuth positions of the object being tracked are transmitted through gates 31 and 32 respectively to elevation and azimuth memory circuits 22 and 23 respectively. Thereby correction for any changes in position of the object being tracked from the prior memorized position information stored in memory circuits 22 and 23 is made. The azimuth and elevation positions of antenna 11 are represented by the voltages appearing at the wiper arms of potentiometers 21 and 19, respectively. During this tracking operation the radar system has remained in the search mode of operation with only the coordinates of the position of the preselected object being tracked having been sent to the tracking circuits 17 when the antenna's position is directed toward the object.

Looking now again at FIG. 4 and at antenna servomotor control system 33 and search generator 37 shown in FIG. 1, it can be seen that during the search mode of operation of the radar system the scanning action of antenna 11 is controlled by servomotors 34 and 36 which are in turn controlled by operation of search generator 37. When the object being tracked comes within a preselected range after which continuous tracking of the object is desired, antenna servomotor control system 33, as shown in FIG. 4, actuates thyratron 101 and relays 102, 103 and 104 to change control of servomotors 34 and 36 for a short period of time to the elevation and azimuth memory circuit voltage so that the antenna 11 will be slewed into a position directed toward the object being tracked.

While it is possible that antenna 11 may be pointed at the target at the time the target range reaches its selected value it is likely that it will not be. It is for this reason that the antenna servomotors are initially coupled to be energized by azimuth and elevation memory circuits 23 and 22. After a time delay sufficient to permit antenna servomotors 34 and 36 to properly position antenna 11, antenna servomotor control system 33 then operates to couple the servomotors to angle tracking circuit 40 of tracking circuit 17. Thereafter, the radar system functions as a conventional tracking radar system. At the time the radar system is automatically converted from search-while-track mode of operation switch 14 may be closed to bypass gate circuits 27 and 28. In this manner the video pulse received from receiver 12 is transmitted directly into tracking circuit 17 and thence to antenna servomotor control system 33 to control the position of antenna 11 and maintain its directivity toward the object being tracked. The closing of switch 14 would eliminate the need for the search-while-track circuitry such as the comparator circuits, the memory circuits and the gates. However, these circuits could be used during the tracking operation, if desired, if switch 14 remains open.

While the operation of the search-while-track radar system has been described in conjunction with tracking of a single object, it is obvious that the tracking function could be changed to a different object if desired. To accomplish this the operator would re-assert control of the position of the antenna 11 by releasing switch 16 so that the contacts would return to their upper position in contact with the control handle. At this time the operator by use of the visual presentation system and the control handle could select a new target whose position would be memorized in elevation and azimuth memory circuits 22 and 23, and the radar system would again be placed in accept condition as hereinbefore described so that the new object could be tracked while the radar continues to search the field.

It is obvious that the above described search-whiletrack radar could be used to track a multiplicity of objects rather than a single object as described.

Obviously many modifications and variations of the present invention are possible in the light of the above teachings. It is therefore to be understood that within the scope of the appended claims the invention may be practiced otherwise than as specifically described.

What is claimed is:
1. In a search-while-track radar system, the combination comprising:
    a radar signal receiving antenna;
    variation means for varying the orientation of said antenna;
    receiving means operably connected to said antenna for receiving a radar signal reflected from a target toward which said antenna is directed;
    tracking means electrically connected to said receiving means for indicating the position of a target toward which said antenna is directed;
    target selection means operably connected to said tracking means whereby an object in space may be selected and tracked while said antenna scans a predetermined field; and
    switching means electrically connected between said target selection means and said tracking means for automatically switching said search-while-track radar system from a search mode of operation to a track mode of operation when the target being tracked comes within a predetermined range of said radar system.

2. A search-while-track radar system such as that described in claim 1 wherein said tracking means includes:
    an angle tracking circuit and a range tracking circuit both coupled to receive a video input from said receiver, said angle tracking circuit suppling an output to said variation means via said switching means; and
    an on-target pulse generator coupled to said target selection means for supplying a pulse to said target selection means whenever said antenna coincides with the target direction.

3. A search-while-track radar system such as that described in claim 2 wherein said target selection means includes:
    antenna azimuth and elevation orientation indicators;
    storage means for storing each of the azimuth and elevation orientation indications of said antenna whenever it is directed toward a preselected target;
    comparator circuit means electrically connected to each of said azimuth and elevation orientation indicators and said storage means for comparing the immediate position of said antenna when scanning with its position when directed toward a preselected target;
    first gating means electrically connected to said comparator circuit means and said receiving means for passing received radar signals to the input of said range and angle tracking circuits when said antenna is directed toward a preselected target; and
    second gating means actuated by a signal from said on-target pulse generator for passing antenna elevation and azimuth information to said storage means when said antenna is directed toward a preselected target to thereby provide said storage means with the correct position information of the preselected target.

4. In a search-while-track radar system, the combination comprising:
    a directional antenna;
    antenna servomotor means operably connected to said antenna for varying the orientation of said antenna in search for targets;
    a detecting receiver coupled to said antenna;
    a tracking circuit electrically coupled to said receiver;
    said tracking circuit including an angle tracking circuit, a range tracking circuit and an on-target pulse generator;
    a first gating means coupling said receiver to said tracking circuit when said antenna is directed toward a preselected target during its search operation;
    signal generating means operably connected to said servomotor means for generating a signal voltage proportional to the orientation of said antenna;
    memory circuit means;
    second gating means for coupling said memory circuit means directly to said signal generating means in response to a signal from said on-target pulse generator;
    comparator circuit means electrically coupled to said signal generating means and said memory circuit means for comparing the signal received from said signal generating means and the signal stored in said memory circuit means for actuating said first gating means when the signal from said signal generating means is approximately equal to the signal stored in said memory circuit; and
    antenna servo circuit control means responsive to the output of said range tracking circuit for connecting said antenna servomotor means to said memory circuit means to slew the antenna to a position such that it is pointed at the preselected target,
    said antenna servo circuit control means after a predetermined time delay coupling signals from said angle tracking circuit to said servomotor means, whereby said radar system functions as a conventional tracking radar system.

References Cited by the Examiner
UNITED STATES PATENTS

| | | | |
|---|---|---|---|
| 2,915,747 | 12/59 | Segertsrom | 343—7.3 |
| 2,995,744 | 8/61 | Covely et al. | 343—7.4 |
| 3,021,522 | 2/62 | Gleason | 343—7.3 |
| 3,064,250 | 11/62 | Close | 343—7 |
| 3,078,457 | 2/63 | Himler et al. | 343—7.3 |

CHESTER L. JUSTUS, *Primary Examiner.*